No. 877,835. PATENTED JAN. 28, 1908.
P. DANIEL.
COMBINED STEERING AND DRIVING AXLE.
APPLICATION FILED MAR. 12, 1907.
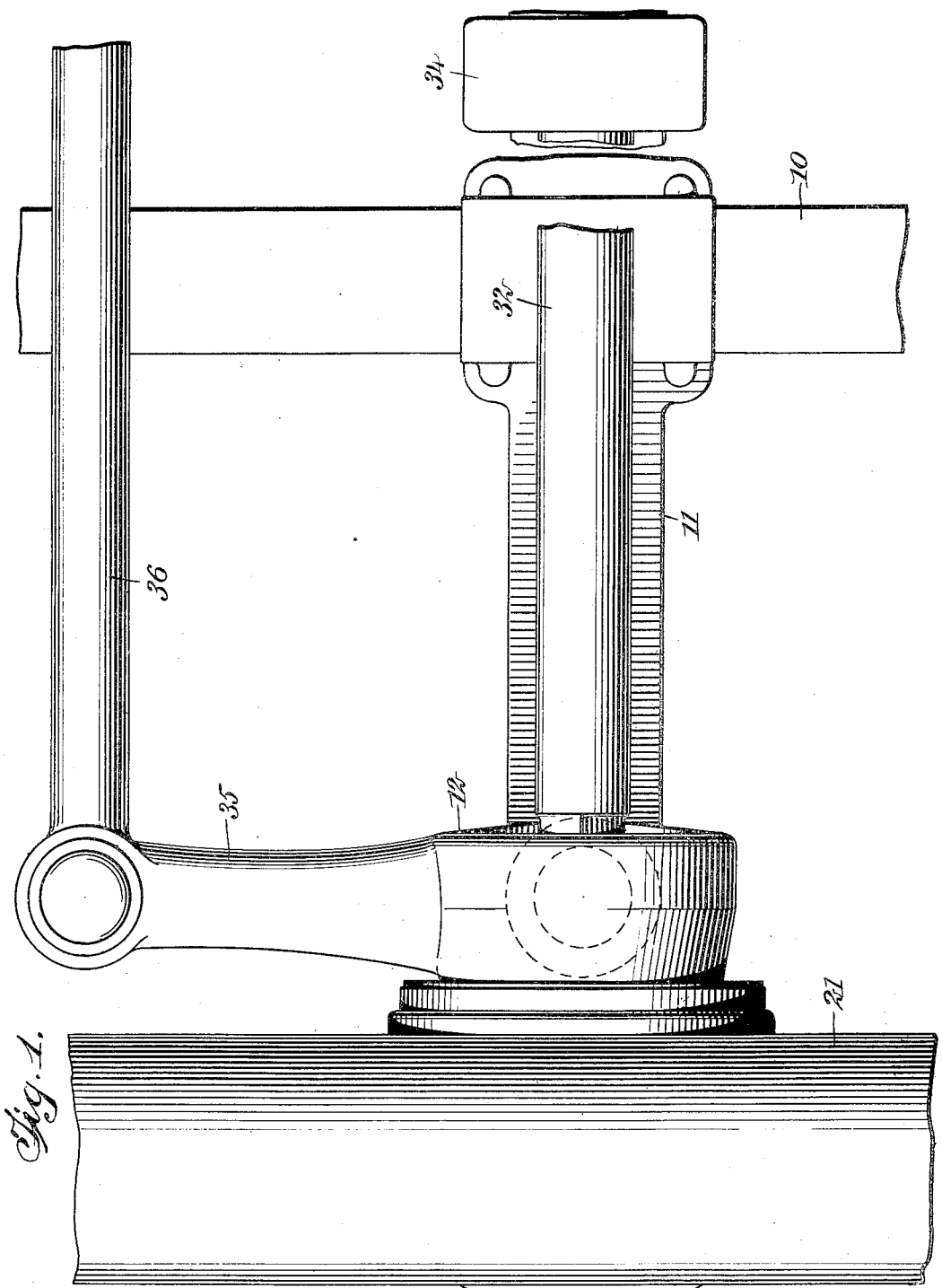

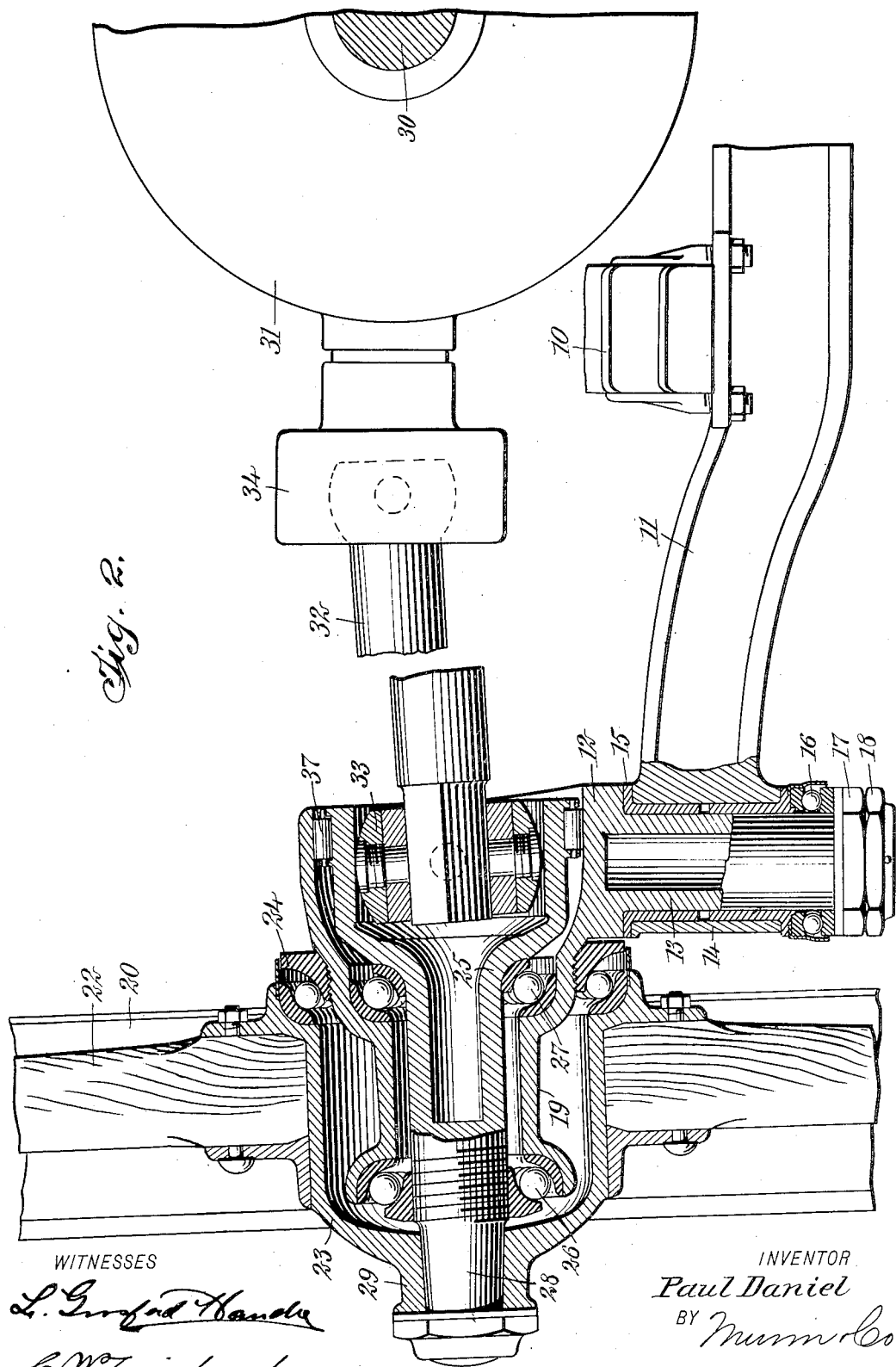

UNITED STATES PATENT OFFICE.

PAUL DANIEL, OF NEW YORK, N. Y.

COMBINED STEERING AND DRIVING AXLE.

No. 877,835.  Specification of Letters Patent.  Patented Jan. 28, 1908.

Application filed March 12, 1907. Serial No. 361,930.

*To all whom it may concern:*

Be it known that I, PAUL DANIEL, a citizen of the Republic of France, and a resident of the city of New York, borough of Manhattan, in the county and State of New York, have invented a new and Improved Combined Steering and Driving Axle, of which the following is a full, clear, and exact description.

This invention relates to certain improvements in motor vehicles, and relates more particularly to means whereby the same axle upon which the steering wheels are mounted may also receive power to propel or aid in the propelling of the vehicle.

The invention consists in certain features of construction and combination of parts, all of which will be fully set forth hereinafter and particularly pointed out in the claims.

Reference is to be had to the accompanying drawings forming a part of this specification, in which similar characters of reference indicate corresponding parts in both the figures, in which Figure 1 is a plan view of a portion of a vehicle embodying my invention; and Fig. 2 is a vertical section showing a detail construction of one embodiment thereof.

In my improved vehicle, the vehicle body, not shown, is supported upon springs 10 rigidly secured to a cross support 11 extending from a point adjacent one of the steering wheels to a point adjacent the opposite end. The entire weight of the adjacent portion of the vehicle body and its operating mechanism rests directly upon this cross support and said weight is transmitted to the wheels by means of the steering knuckles 12. Each steering knuckle comprises a spindle portion 13 mounted to rotate within a collar 14 carried by the cross member 11 and supported therefrom by an anti-friction lining 15 of any suitable character. One end of the spindle extends through the collar 14 and is provided with suitable mechanism to hold it in place and facilitate the rotation thereof. As illustrated, this means comprises a ball-bearing 16 adjusted and held in place by a nut 17 and lock nut 18.

The upper end of the steering knuckle 12 extends outwardly at substantially right angles to the spindle 13, and comprises a hollow cylindrical sleeve 19 concentric to and extending through the vehicle wheel. The sleeve 19 is preferably integral with the spindle 13 and is formed of cast steel or other suitable material, although it is evident that the steering knuckle may be made up of a plurality of separate parts if desired.

The vehicle wheel may have a rim 20, tire 21, and spokes 22 of any suitable character and carried by a cylindrical hub 23 surrounding the sleeve 19 of the steering knuckle. Suitable ball bearings 24 are interposed between the hub 23 and the sleeve 19 to facilitate the rotation of the wheel, but as the hub is supported at the outer end by means hereinafter described, it will normally be found sufficient to provide the ball bearings 24 at only the inner end of the hub, as illustrated in Fig. 2.

Extending through the sleeve 19 of the steering knuckle is the outer end of my improved driving means. This means comprises an axle 25 separated from the sleeve 19 by ball bearings 26 and 27 adjacent the opposite ends of said sleeve and having its outer end 28 extending out through the end of the sleeve and rigidly or detachably connected to an extension 29 of the hub 23. It will thus be noted that the sleeve 19 of the steering knuckle projects outward between two separate rotating parts, which are rigidly secured together, namely, the hub 23 which surrounds the sleeve, and the rotating axle 25 extending through the sleeve. The axle 25 is connected to the main drive shaft 30, whereby the former may be rotated, and this connection normally includes suitable transmission gearing inclosed within the casing 31 and delivering the power to a rotating shaft 32 connected by universal joints 33 and 34 to said transmission gearing and said axle 25. The universal joints may be of any suitable character, but the universal joint 33 is located in alinement with the axis of rotation of the spindle 13 of the steering knuckle, whereby when the said knuckle is rotated, the transmission of power to the vehicle wheel is not in any way interfered with. To take up the relative movement between the cross member 11 and the vehicle body which supports the drive shaft 30, due to the action of the springs 10 interposed therebetween, I preferably make one end of the shaft 32 square in cross section and longitudinally movable through the inner member of one of the universal joints.

The mechanism for rotating the steering knuckle may be of any suitable character, as, for instance, an arm 35 integral with or rigidly secured to said knuckle and connected to a longitudinally movable and manually controlled connecting bar 36.

Various details of construction illustrated in the drawings may be varied within the scope of the appended claims, and various mechanism employed for reducing the friction of the operating parts. The inner end of the axle 25 adjacent the universal joint 33 may, if desired, be supported above the steering knuckle by roller bearings 37, and other suitable anti-friction means may, if desired, be interposed between the upper end of the spindle 13 and its inclosing and supporting collar 14.

Having thus described my invention, I claim as new and desire to secure by Letters Patent:

1. A motor vehicle, comprising a cross member adapted to support the vehicle body, a steering knuckle pivotally connected to each end thereof, wheels rotatably mounted upon said steering knuckles, a driving axle comprising a plurality of sections, one of said sections extending through one of the steering knuckles and having an enlarged end, and the other of said sections being connected thereto by a universal joint within said expanded end and anti-friction bearings intermediate said expanded end and said steering knuckle.

2. A motor vehicle, comprising a cross member, a steering knuckle pivotally mounted adjacent the end thereof, a vehicle wheel rotatably mounted upon said steering knuckle, a driving axle comprising a plurality of sections, one of said sections being operatively connected to said wheel, and having a hollow expanded end, and the other of said sections being connected to the first mentioned section by a universal joint within said expanded end, and anti-friction bearings between said first mentioned section and said steering knuckle and disposed adjacent the intersection of the body of the section with the expanded end.

3. In a motor vehicle, the combination of a steering knuckle having a pivot portion and a cylindrical sleeve, a vehicle wheel rotatably mounted upon said sleeve, and a driving axle comprising a plurality of sections, one of said sections extending through said sleeve and the other of said sections being connected thereto by a universal joint, said sleeve being expanded adjacent each end thereof to provide for the reception of anti-friction bearings between the sleeve and the first mentioned section of the axle, and said section being expanded to form an enlarged end and a shoulder against which one of the bearings is seated.

In testimony whereof I have signed my name to this specification in the presence of two subscribing witnesses.

PAUL DANIEL.

Witnesses:
CLAIR W. FAIRBANK,
EVERARD B. MARSHALL.